Patented Apr. 11, 1939

2,154,138

UNITED STATES PATENT OFFICE 2,154,138

ELECTRICAL INSULATION

Helge Rost, Mexico, D. F., Mexico

No Drawing. Application May 25, 1935,
Serial No. 23,413

3 Claims. (Cl. 106—12)

This invention relates to a new and useful composition of matter particularly useful as an electric insulator for low- and high-tension, telegraph, telephone and high frequency currents.

Various kinds of insulating compositions of plastic compounds for example are known, but most of them have not met with success, owing to the fact that they are made up of different and heterogeneous materials. Some use an organic or a synthetic resin, either pure or mixed with heterogeneous materials. However, most resins in pure state are either too hard and brittle or too sticky and soft to be suitable for insulation purposes. To obviate this difficulty, heterogeneous materials such as sulphur, rosin, tar, bitumen, oils, fibrous material containing air, water, acids, or other resinous materials, have been added to the resin.

Heterogeneous mixtures have as a rule very poor and unstable insulating qualities to the detriment of continuous service.

These defects are best obviated according to the present invention, by using an electrical insulating composition, which consists of synthetic, homogeneous, organic, stable, chemical reaction products of zero electric moment, without heterogeneous inclusions. If desired, said chemical reaction products may contain plasticizing compounds of such chemical similarity that they homogeneously blend with said chemical reaction products, without changing their homogeneous structures.

Painstaking research revealed that the electric moment is a definite specific property of the substance and depends on conditions within the atom.

This fact may be explained as follows: When a dielectric is subjected to an electric field, displacements of the positive and negative charges in the dielectric occur. These displacements relative to one another result in polarization of the dielectric. Thus, a negative charge may be observed on one side of the dielectric while a positive charge is present on the other side.

I discovered that highest requirements will be satisfied when a "balanced" insulator is used. In other words, the center of the positive nucleus of the atom and the negative center of the electrons must coincide. If this condition is lacking, unsymmetry of the distribution of electrons exists, giving rise to an electric moment. It may be shown by experimetal calculations that molecules which have a balanced structure, with its atom nuclei charges symmetrically arranged, are of zero electric moment.

An outstanding feature of the insulators according to the present invention is the fact that they consist of or comprise materials having zero electric moments. I found that the lowest dielectric constant or specific inductive capacity exists in those chemical reaction products of zero electric moment which have saturated molecules and linkages, e. g. saturated aliphatic hydrocarbons.

Fluctuations in temperature frequently cause variations in the dielectric. In a perfect dielectric of unpolarized molecules, temperature variations will cause little or no variation of the dielectric constant.

I have also found that insulators composed of several heterogeneous substances have a tendency to raise the dielectric specific inductive capacity with a corresponding increase of dielectric losses.

This fact may be accounted for as follows: In an electric field, a globule of high dielectric constant surrounded for example by a liquid medium of low dielectric constant is urged into the strongest part of the field. And conversely, a globule of low dielectric constant surrounded by a medium of high dielectric constant is urged away from the strong part of the field toward the weak parts thereof. In other words, such insulators are unbalanced and will eventually break down under the disruptive stresses set up in the same.

Accordingly, the materials preferably used in the present invention, are chemical reaction products which have saturated molecules and linkages with as near zero electric moments as possible, since such materials have lower specific inductive capacity and lower dielectric losses, than materials having molecules with a considerable electric moment.

Such materials having molecules with zero electric moment will have dielectric losses independent of temperature variations. This is a very desirable feature of a dielectric because most dielectrics, which have been used heretofore, showed increased dielectric losses at increased temperatures.

In insulating compositions according to this invention, conduction and absorption in the dielectrics will be absent or exceedingly low, because said dielectrics are free from impurities.

The chemical reaction products, which according to this invention are preferably used and which have saturated molecules and linkages, of zero electric moment, are the following:

Saturated electrically symmetrical aliphatic hydrocarbons such as the normal paraffins from pentane to dodecane, the isomers of heptane and 2,2,4-trimethylpentane, in addition to those of methane and ethane.

Saturated electrically symmetrical cyclic hydrocarbons and derivatives of benzene, diphenyl and naphthalene.

Compounds like cyclohexane, methylcyclohexane, dioxane, quinone, etc.

Natural or synthetic resins or such resins combined with plasticizers have been proposed as electric insulators. However, in such compositions additional solvents are generally used which must be volatilized before the product can be employed. Very often not all the solvent can be volatilized, but part of it remains in the finished product to the detriment of dielectric qualities, and to the detriment of the mechanical stability of said product, later on gradually changing the physical and dielectrical characteristics of the product.

A chemical reaction product according to this invention is preferably a final and stable reaction product of saturated linkage.

According to this invention the insulating material may be composed of a plurality of chemical reaction products. In such case, these chemical reaction products are of chemically allied character, at least one of the components being fusible and/or soluble in the other component or components.

If desired, plasticing compounds may be added. The plasticizers should be added at the beginning to produce a homogeneous, saturated chemical composition.

Insulating materials

The materials further used according to this invention consist of a synthetic, organic, homogeneous, isotropic, chemical reaction product, without heterogeneous inclusions. Only such homogeneous chemical reaction products of definite organic linkages that contain no foreign or heterogeneous inclusions, such as water, acids, salts, air, filters, etc., should be used in accordance with the present invention because said substances show the lowest dielectric constants and lowest dielectric losses, as there exist no conducting paths through the dielectric.

The organic chemical reaction products which can also be used according to this invention are polymerizable or polymerized hydrocarbons or derivates thereof.

The following further examples of suitable compounds of zero electric moment illustrate the variety of combinations that can be made:

Aliphatic compounds with electrically symmetrical molecules, for instance, electrically symmetrical dimethylbutadien, electrically symmetrical diphenyl-ethylene, electrically symmetrical aryl-substituted ethylenes; 1:4-divinylbenzene.

Plasticizers

Diphenylpropane, naphthalene, xylene, cyclohexane or other hydrocarbons or homologues.

Examples of polymerization products

Polymerization products of unsaturated compounds having electrically symmetrical monomeric molecules, for example, polymerized dimethyl-butadien, polyermized 1:4-divinylbenzene, etc.

Many of the synthetic resins are apt to burn if exposed to a flame, and it is therefore desirable to use such compounds, that will make the final product uninflammable and this is specially the case in high tension insulators.

Although the electric wind following an electric high tension discharge will blow out or prevent a steady flame should the dielectric start burning, it is possible so to chose the constituents of the chemical reaction products that the final product will be uninflammable.

A comparison between the insulators according to the present invention and the insulators used heretofore shows that the latter are inferior due to various causes, thus—porcelain very often contains capillary canals, filled with air and moisture; plastic insulators contain fillers like asbestos, sulphur, litharge, magnesia, French chalk, zinc oxide, whiting, lithopone, colored pigments, air, water, traces of acids, etc. The impurities of such heterogeneous compounds tend to increase the conduction paths through the dielectric and give, besides, rise to dielectric hysteresis (absorption), ionization and chemical reactions inside the dielectric, causing heavy dielectric losses.

The insulation materials according to the present invention, on the other hand, consist of or comprise synthetic, homogeneous, isotropic, organic, stable, chemical reaction products of zero electric moment, without heterogeneous inclusions. In such reaction products, no secondary reactions can take place under stress.

I claim:

1. As a new composition of matter, an electrical insulation of low hysteresis losses consisting of a plurality of cyclic organic compounds, each one of electrically symmetrical molecules of substantially zero electric moment.

2. The electrical insulation claimed in claim 1, in which one of said compounds is a substituted derivative of a cyclic organic compound selected from the group consisting of symmetrically substituted benzenes, diphenyls and naphthalenes.

3. An electrical insulating composition of low dielectric hysteresis losses, consisting of a plurality of organic compounds, each compound having an electrically symmetrical molecular structure and having substantially zero electric moment, at least one of said compounds being a carbocyclic compound.

HELGE ROST.